United States Patent [19]
Thureau et al.

[11] 3,937,599
[45] Feb. 10, 1976

[54] PUMPING SYSTEM USING SOLAR ENERGY

[75] Inventors: Pierre Thureau, Cachan; Michel Bremont, L'Hay-les-Roses, both of France

[73] Assignee: Agence Nationale de Valorisation de la Recherche (ANVAR), Neuilly-sur-Seine, France

[22] Filed: Oct. 11, 1974

[21] Appl. No.: 514,175

[30] Foreign Application Priority Data
Oct. 19, 1973 France .............................. 73.37374
July 5, 1974 France .............................. 74.23399
July 12, 1974 France .............................. 74.24278

[52] U.S. Cl. ................. 417/389; 417/379; 60/641; 60/531
[51] Int. Cl.² .. F04B 17/00; F04B 9/08; F03G 7/02; F03C 5/00
[58] Field of Search ............ 417/379, 383, 53, 389; 60/641, 531

[56] References Cited
UNITED STATES PATENTS

| | | | |
|---|---|---|---|
| 2,688,923 | 9/1954 | Bonaventura et al. | 417/379 |
| 2,867,974 | 1/1959 | Wenander | 60/531 |
| 3,112,862 | 12/1963 | Sherock | 417/379 |
| 3,604,822 | 9/1971 | Saxe | 60/531 |

Primary Examiner—John J. Vrablik
Assistant Examiner—Richard E. Gluck
Attorney, Agent, or Firm—Diller, Brown, Ramik & Wight

[57] ABSTRACT

A pumping system comprising a pumping unit formed by a motor and a pump and adapted to raise a liquid from an underground level to a utilization level, a vaporizable fluid flowing in a closed circuit between a solar evaporator and a condenser, the said motor being disposed in the outgoing branch between the evaporator and the condenser, and a circulator being disposed in the return branch. The motor comprises a motor chamber which is connected by an internal bistable distributor either to the evaporator when said distributor is in an intake state, or to the condenser when said distributor is in an exhaust state, said motor chamber being partly limited by a flexible wall free to move between an intake stroke end position and an exhaust stroke end position, the flexible wall triggering the changes of state of the distributor by reaching its two end positions. The distributor is biased by a resilient means into one of its two stable states on either side of an unstable equilibrium position and is urged into its stable exhaust state by a flexible band tensioned by the flexible wall in the intake stroke end position, and is pushed into its stable intake state by the flexible wall in its exhaust stroke end position. The pumping unit also comprises a transmission chamber separated from the said motor chamber by the said flexible wall, and a pump unit having, on either side of a deformable diaphragm, a pump chamber provided with an intake valve drawing from the underground liquid level, and a delivery valve for delivery to the said utilization level and a reception chamber communicating with the said transmission chamber via a two-way pipeline, an incompressible transmission liquid complementally filling the said transmission and reception chambers as it flows in the two-way pipeline.

25 Claims, 12 Drawing Figures

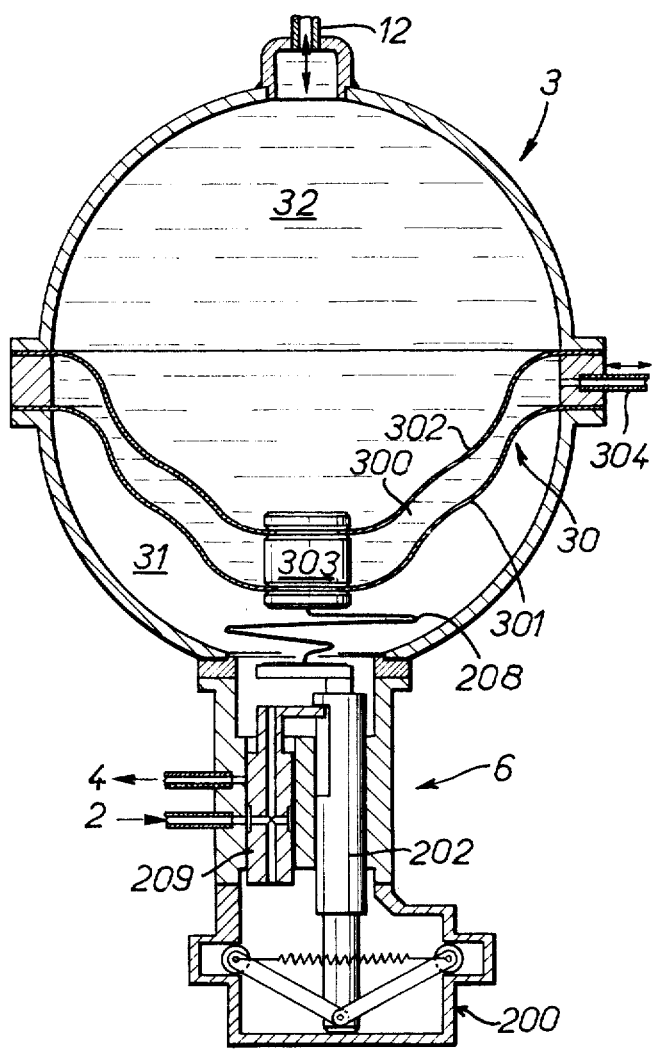
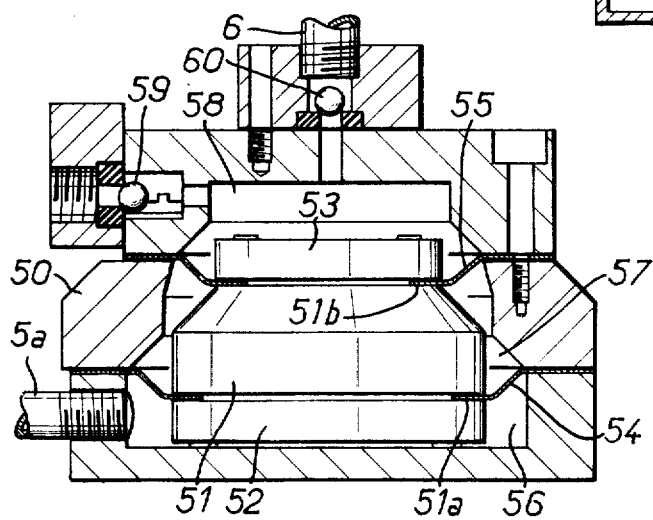

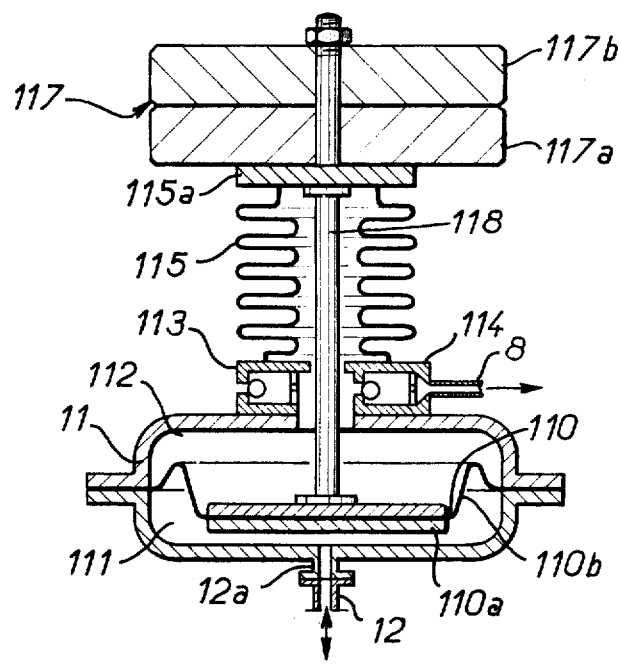
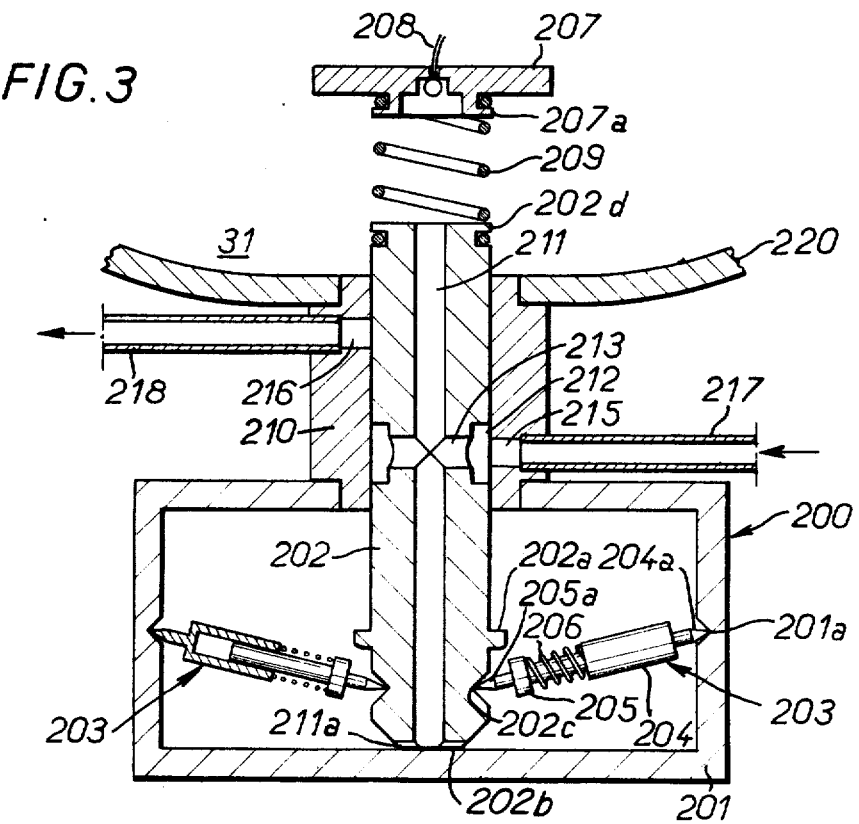

PUMPING SYSTEM USING SOLAR ENERGY

BACKGROUND OF THE INVENTION

This invention relates to a pumping system adapted to raise a liquid, more particularly water, from an underground level to a utilization level, said system being actuated by the thermal flux radiated by the sun, through the agency of a vaporizable fluid.

In those parts of the world which have long periods of sunshine, the use of the thermal flux radiated by the sun to produce energy has been the subject of numerous tests and some applications. The relatively low radiated power density, on average of the order of 1 kilowatt per square meter during periods of sunshine, and the low thermodynamic efficiency obtainable in relatively uncomplicated installations, mean that this energy production is rarely competitive with conventional energy production processes.

Nevertheless, in underdeveloped areas far from conventional energy production centers the cost of transmitting such energy may offset the low efficiency of solar installations and make the latter competitive.

Applications are known in which solar energy is used for pumping water from underground levels. Such applications generally use a vaporizable fluid which is heated and vaporized in solar panel evaporators, the vapor produced being fed to a motor which actuates a pump adapted to draw water from the underground level and raise it to a utilization level, for example a water-tower.

A solar panel evaporator comprises a surface aimed on average at the sun and blackened for optimum absorption of the solar flux, and a tube or nest through which a fluid for vaporization passes and in thermal contact with the absorbent surface; the solar panel is generally thermally insulated to avoid heat losses to the atmosphere, and its surface exposed to the sun is covered with glazing to protect it from dust and reduce thermal losses due to convection, or the glass-house effect.

The motor is generally a reciprocating piston engine which is better than a turbine for withstanding the pressure and vapor flux variations due to the daily and seasonal variations in the solar flux picked up by the evaporator panels; also, the operating characteristics of the piston engine are better suited to the operating characteristics of the pump.

Since the temperature of the hot source formed by the solar panels is less than the boiling point of water, at least in marginal sunshine conditions, water cannot be used as vaporizable fluid; a fluid having a lower boiling point must therefore be used so that the pressure in the evaporator at mean operating temperature is at a few bars. Free discharge is impossible in that case and the vaporizable fluid must flow in a closed circuit, with a condenser and a circulator to feed the vaporizer with condensed fluid under pressure. The presence of a condenser also improves the thermodynamic efficiency of the installation.

Such installations exist and operate correctly but they have a number of drawbacks.

The piston engine must be disposed above ground for maintenance and supervision; the pump it drives may be situated at the same level for direct coupling to the motor if the water to be pumped is not at too deep a level, i.e., less than 8 to 9 meters lower than the pump, since otherwise the pump must be lowered towards the underground water and coupling to the motor becomes complicated and a source of energy losses due to mechanical friction.

The motor cannot start itself under the effect of pressure following progressive heating of the vaporizer in the morning, for example; an adequate pressure has to build up in the vaporizer to ensure an operating speed and vapor flow equivalent to smooth operation.

The condenser must be immersed in a cold source; if it comprises a radiator with natural cooling, the radiator must be very large and protected from the solar radiation; ventilation of the radiator by forced air flow consumes energy.

The piston and piston rod packings cannot be perfectly sealing-tight in practice and vaporizable fluid has to be replenished from time to time.

Finally, operation and mechanical maintenance of the installation necessitate the presence of a skilled supervisor, and this restricts the location of such installations to relatively large centers.

SUMMARY OF THE INVENTION

The invention relates to a pumping system actuated by solar energy without these disadvantages and adapted, more particularly, to operate without the need for an operator and to raise a liquid above barometric level.

To this end, the invention proposes a pumping system comprising a pumping unit formed by a motor and a pump and adapted to raise a liquid from an underground level to a utilization level, a vaporizable fluid flowing in a closed circuit between a solar evaporator and a condenser, to said motor being disposed in the outgoing branch from the evaporator to the condenser and a circulator being disposed in the return branch to the said evaporator; and in which system the motor comprises a motor chamber which is connected by a bistable distributor either to the evaporator when said distributor is in an intake state, or to a condenser when said distributor is in an exhaust state, said motor chamber being partly limited by a flexible wall triggering the changes of state of the distributor by reaching its two end positions, the said pumping system being characterized in that it comprises in combination an internal distributor biased by a resilient means into one of its two stable states on either side of an unstable equilibrium state, and is urged into its stable exhaust state by a flexible band tensioned by said flexible wall in the intake stroke end position, and is pushed into its stable intake state by said flexible wall in its exhaust stroke end position, a transmission chamber separated from the said motor chamber by the said flexible wall, and a pump unit having, on either side of a deformable diaphragm, a pump chamber provided with an intake valve drawing from the said underground water level and a delivery valve for delivery to the said utilization level, and a reception chamber communicating with the said transmission chamber via a two-way pipeline, an incompressible transmission liquid complementally filling the said transmission and reception chambers as it flows in the said two-way pipeline.

With this arrangement, the circuit in which the vaporizable fluid flows can be made perfectly sealing-tight since it has no sliding joint to the exterior, the only movable wall being a continuous flexible wall and the internal distributor being completely contained in said circuit, including the means for controlling its change of state. Since these control means are independent and are in a stable position only for intake or exhaust, the pumping system operates completely independently. The transmission of movement between the motor and the pump is provided by a hydraulic transmission also in a sealed closed circuit, the only movable walls being the flexible wall and the deformable diaphragm, so that the motor can be disposed at a distance from the pump without any appreciable energy loss, and the pump can be submerged in the underground water, the pumping level being limited only by the pressure of vaporized fluid at the evaporator.

Preferably, the said distributor comprises a locking means with a slide adapted to move between two end positions in response to the action of the said flexible wall and urged into one of the said two end positions by the said resilient means on either side of an unstable equilibrium position, an intake closure means, an exhaust closure means, and a transmission member between the said locking means and the said closure means adapted to close a first closure means and then open the second closure means after the said slide has passed the said unstable equilibrium position.

This arrangement completely eliminates any neutral positions and any short-circuits between the evaporator and the condenser. On the one hand, the closure means are never simultaneously open, even temporarily, during the changes of state, and on the other hand the successive operations of the closure means take place only after the slide has passed the unstable equilibrium position, i.e., during a slide travel which has a state of equilibrium only at the end of its travel and which occurs solely as the action of the resilient means.

The closure means may be valves controlled by cams borne by the transmission means or a sliding or pivoting spool formed with ports, one of which is closed when the other is open.

To ensure that the closure means are operated after the slide has passed the unstable equilibrium position, the said transmission member being constantly in engagement with said slide, the latter is actuated by the flexible wall through the agency of a resilient connecting means adapted to act on said slide beyond the said unstable equilibrium position when the said flexible wall reaches the said stroke end positions.

The resilient connecting means stores energy when the flexible wall approaches its stroke end positions, said energy being restored to operate the control means after passing the unstable equilibrium position which is displaced as a result of the counter-action of the resilient means of the locking means and of the resilient connecting means.

In a preferred embodiment, the said transmission member comprising a driving member connected to the said slide and a driven member in constant engagement with the said closure means, a clearance is provided between the driving and driven members so that the driving element drives the driven element only after the said slide has passed the said unstable equilibrium position. This variant gives a geometrically defined operation which is therefore particularly reliable.

The condenser may be submerged in the underground water. A volume containing cooling liquid is then available. In a variant, the condenser may be submerged in a reservoir fed with liquid pumped to the utilization level. The motor, evaporator and condenser can then be combined at this utilization level, the vaporizable fluid flow circuit being shortened.

Advantageously, the said flexible wall is made up of two substantially equidistance flexible diaphragms fixed at their periphery to a body forming an outer wall of the said motor and connected at their center by a spacer and defining between them a central cavity filled with an incompressible liquid.

This feature reduces the heat exchanges between the vaporizable fluid and the transmission liquid and reduces the disadvantages due to the bursting of a diaphragm.

Advantageously, the said circulator comprises on either side of a free piston: a pump cylinder provided with valves adapted to pass the said vaporizable fluid unidirectionally from the condenser to the evaporator, and a motor cylinder communicating either with the transmission chamber or with the central cavity via a two-way conduit so that the said transmission liquid actuates the said free piston.

Since the pumping system is thus rendered independent as regards operation, any variations in the pressure in the motor chamber operating under intake or exhaust conditions and transmitted by the flexible wall to the incompressible liquid cause the circulator to operate in time with the motor.

Preferably, the pump cylinder has a smaller section than the motor cylinder and the piston slides in sealing-tight relationship also in both cylinders. It is thus possible to obtain a higher pressure in the pump cylinder such as is required to feed the evaporator suitably.

This sealing-tightness is advantageously produced by substantially non-extensible deformable diaphragms. This step eliminates any possible leakage of the vaporizable fluid into the incompressible liquid.

Advantageously, a return means urges the said free piston into the said pump cylinder for the intake stroke. This feature assists the circulation of the vaporizable fluid from the condenser to the circulator.

In one advantageous feature of the invention, a return means in the pump unit urges the deformable diaphragm in the direction which delivers the transmission liquid to the transmission chamber. This return means enables the flexible wall of the motor to be biased in its exhaust stroke even when the difference in level between the motor and the pump unit submerged in the underground water is considerable, the hydrostatic head of the transmission liquid being compensated.

Preferably, the deformable diaphragm being substantially non-extensible, the return means acts on said diaphragm with a constant adjusted force. Because of the non-extensibility of the deformable diaphragm, the result of the constant force is a constant counteracting pressure on the transmission liquid, adjusted to compensate for the said hydrostatic head.

The return means may be a counterweight. It may also comprise resilient bars or rods subjected to buckling stress; the reaction of a bar or rod to buckling is in fact substantially constant over an appreciable travel.

Advantageously, the said return means biases the said non-extensible deformable diaphragm by means of a hydraulic transmission comprising transmission and receiver cylinders with longitudinally deformable non-extensible side walls.

Advantageously again, the said pump unit comprises a plurality of deformable diaphragms disposed between alternate reception and pump chambers, each of said deformable diaphragms being biased by the said return means in the direction which delivers the said transmission liquid to the said transmission chamber. This feature reduces the amplitude of deformation of the diaphragms.

According to a particularly advantageous feature of the invention, the pumping unit comprises on the one hand a motor unit consisting of a master enclosure divided by a first flexible wall into a first motor chamber and a first transmission chamber, a slave enclosure divided by a second flexible wall into a second motor chamber and a second transmission chamber, and a bistable distributor switched at the ends of the strokes of the first flexible wall and adapted to bring the said first and second motor chambers into symmetrical alternate communication with the said evaporator and the said condenser and, on the other hand, a pump unit divided into two elements by a non-deformable partition, a reception body divided by a first deformable diaphragm into two complementary reception chambers respectively communicating with the said first and second transmission chambers via two two-way pipelines, an incompressible transmission liquid complementally filling the two reception chambers and the first and second transmission chambers, and a pump body divided by a second deformable diaphragm into two pump chambers each provided with intake valves for drawing from the underground water and delivery valves for delivering to the utilization level, the first and second diaphragms being connected by a central spacer extending through said partition via an orifice closed by a bellows.

In this way, simply by the operation of the distributor there is always a motor chamber operating under intake conditions and the evaporator constantly delivers energy to the pumping unit. The fact that the flexible walls are connected in opposition by the complementary filling action of the system comprising the first transmission and reception chambers and the system comprising the second transmission and reception chambers ensures not only the exhaust of the motor chambers but also the constant transmission of energy to the pump unit. The equilibrium of the hydrostatic heads of the transmission liquid in the two two-way pipeline eliminates the need for any compensation by a return means.

Advantageously, the first and second deformable diaphragms have unequal areas. In this way it is possible to dissociate the pressure of the vaporizable fluid at the evaporator and the hydrostatic pressure of the head of liquid to be pumped between the underground and the utilization levels. With a reduced diaphragm area between the pump chambers the possible pumping head is increased whereas the rate of flow is increased in the case of an enlarged area.

Preferably, the said circulator comprises two motor cylinders terminating in deformable diaphragms bearing on either side of a doubleacting in-line pump, the said motor cylinders being complementally fed with incompressible liquid by two two-way conduits respectively leading from the master and slave enclosures, while the said doubleacting pump communicates with the condenser via intake valves and with the evaporator via delivery valves.

In this way, the alternate pressures in the two chambers are transmitted via the two flexible walls and the incompressible liquid alternately to the two motor cylinders thus ensuring that the evaporator is supplied with condensed vaporizable fluid by the double-acting pump, to correspond to the consumption of vaporized fluid by the motor chambers.

Advantageously, the said bistable distrbutor comprises a slide spring-biased into one of two end positions on either side of a central unstable equilibrium position and subjected to traction by means of a flexible band by the said flexible wall reaching the end of the intake stroke and pushed by said flexible wall when it reaches the end of its exhaust stroke, and an oscillating spool adapted to symmetrically and alternately change-over the intake and exhaust to the two motor chambers in response to the said slide passing the said unstable equilibrium position.

This results in entirely independent double-acting operation without any neutral positions.

Preferably, the said vaporizable fluid is selected from the group comprising trichloromonofluoromethane, trichlorotrifluoroethane and the aliphatic pentanes.

These substances are well suited to solar evaporators because of their vapor pressures at the temperatures obtained both in the solar evaporator and in the condenser.

BRIEF DESCRIPTION OF THE DRAWINGS

The characteristics and advantages of the invention will be apparent from the following description which is given by way of example with reference to the accompanying drawings wherein:

FIG. 2 is a sectional elevation of a motor.

FIG. 3 shows a distributor with a locking slide, a connecting spring and a sliding spool.

FIG. 6 shows a circulator.

FIG. 7 illustrates a pump unit with a counterweighted return means.

DETAILED DESCRIPTION OF THE PREFERERD EMBODIMENTS

Figure 1:
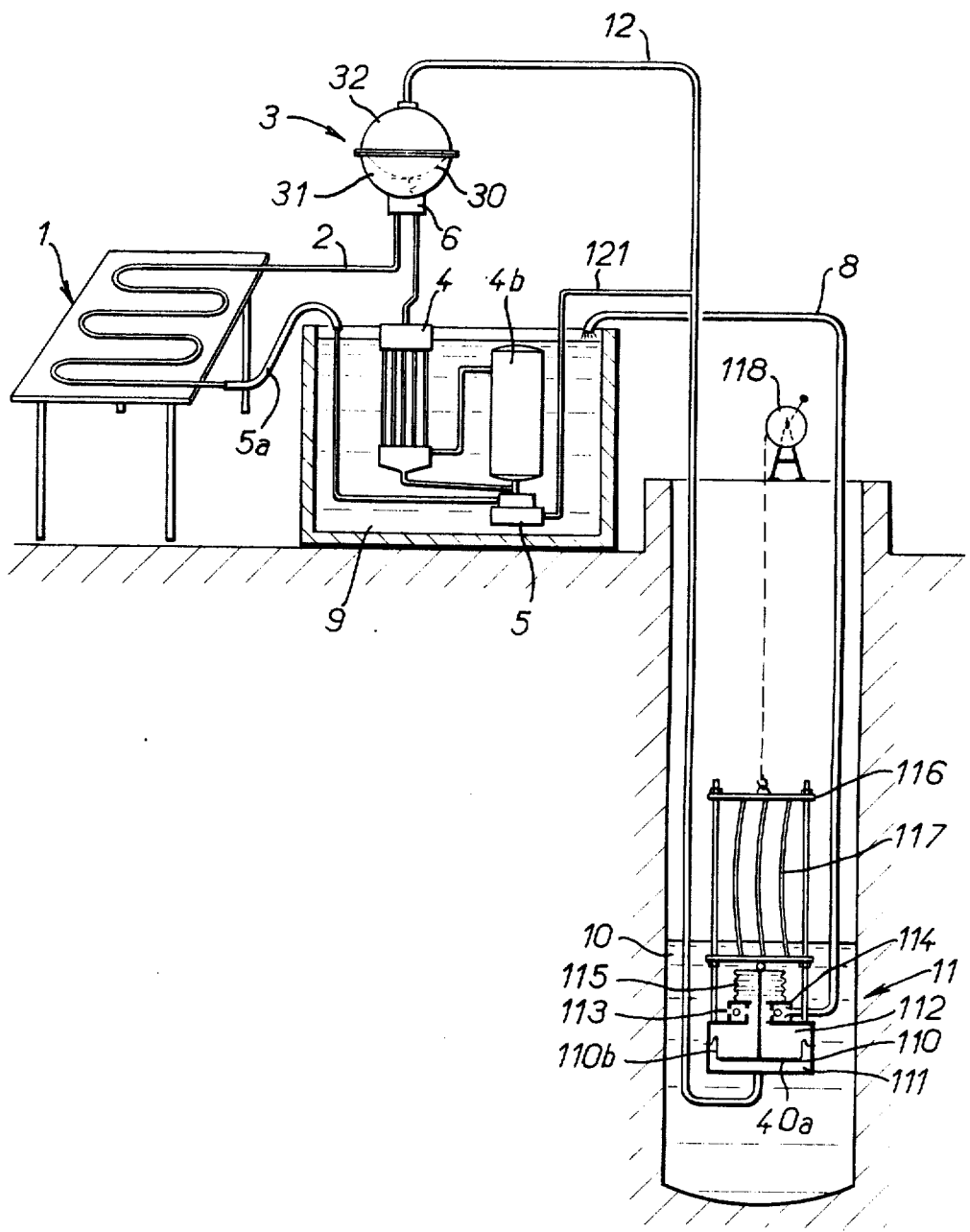
FIG. 1 is a general diagram of a system according to the invention.

Referring to the embodiment selected and illustrated in FIG. 1, a solar panel 1 acts as an evaporator for a vaporizable fluid. The vaporized fluid is fed to the motor unit 3 by the pipeline 2. The motor unit 3 is divided into two chambers by a flexible wall 30, namely a motor chamber 31 and a transmission chamber 32. A bistable distributor 6 connects the motor chamber 31 to the pipeline 2 in its intake state and to a condenser 4 in its exhaust state. As will be described in greater detail hereinafter, the changes of state of the distributor 6 are brought about by the flexible wall 30 reaching its two end positions. The vaporizable fluid passes from the condenser 4 to the reservior 4b, from which it is drawn by a circulator 5 to be fed to the solar panel 1.

Transmission chamber 32 communicates via the two-way pipe 12 with a reception chamber 111 of a pump unit 11. An incompressible fluid flows in the pipeline 12 and complementally fills the transmission chamber 32 and the reception chamber 111. A deformable diaphragm 110 divides the pump unit 11 into a reception chamber 111 and a pump chamber 112 provided with an intake valve 113 and a delivery valve 114. Intake valve 113 connects the pump chamber 112 to the underground liquid 10 which it is required to pump and in which the pump unit 11 is immersed. The liquid delivered via the valve 114 is fed via the pipeline 8 to the reservoir 9 at the utilization level. The condenser 4 and the vaporiable fluid reservoir 4b are immersed in this reservoir 9.

The deformable diaphragm 110 is non-extensible in the pump unit 11, i.e., its surface undergoes practically no change when it experiences differential pressures. It is formed by a rigid central disc 110a and a non-extensible flexible periphery 110b. A return means formed by leaf springs 117 operating under buckling stress and held by the frame 116 biases the diaphragm 110 in the direction for delivering the incompressible liquid from the reception chamber 111 to the transmission chamber 32. A metal concertina diaphragm 115 transmits the forces of the leaves 117 to the diaphragm 110 while providing sealing-tightness of the pump chamber 112. A branch pipe 121 leads from the two-way pipe 12 and extends to the circulator 5 to actuate the latter. The pump unit 11 can be lowered into the underground liquid 10 by means of the winch 118.

As will be clearer from FIG. 2, the flexible wall 30 dividing the motor chamber 31 from the transmission chamber 32 is composed of two substantially equidistant flexible diaphragms 301, 302 secured at their periphery to the unit body 3, and connected at their center by a spacer 303 defining a central cavity 300 between them, this cavity being filled with an incompressible liquid. A nozzle 304 enables this cavity to be filled and connected to the circulator 5 as required. The end of a flexible band 208 is secured to the central spacer 303 and its other end is secured to the slide 202 of the distributor 6 so that when the flexible wall 30 nears the end of its intake stroke, which is at the top in the drawing, the flexible band is tensioned and subjects the slide 202 to traction. When the flexible wall 30 reaches the end of its exhaust stroke, which is substantially in the position shown in the drawings, the spacer 303 bears on the end of the slide 202 in the top position and pushes it into the bottom position.

The pumping system operates as follows: the solar radiation impinging on the panel 1 heats and vaporizes the vaporizable fluid. The vaporized fluid is received in the motor chamber 31 since the distributor 6 is in the intake position, and it pushes back the flexible wall 30 and, through the agency thereof, the incompressible fluid contained in the transmission chamber 32 into the two-way pipeline 12, which is thus put under positive pressure. When the flexible wall 30 reaches the end of the intake stroke, it causes the change of state of the distributor 6 which is then in the exhaust state. The vaporizable fluid is discharged from the motor chamber 31 to the condenser 4 by the flexible wall 30 biased by the incompressible liquid which is at a higher pressure than the pressure in the condenser 4. The vaporizable fluid condenses in this condenser 4, passes by gravity to the reservoir 4b from which it is drawn by the circulator 5 actuated by the pressure variations of the incompressible fluid which are transmitted by the branch pipe 121. Operation of the circulator 5 will be described hereinafter. When the flexible wall 30 drawn in by the pressure lower than that of the incompressible fluid in the condenser 4, reaches the end of its exhaust stroke it causes the change of state of the distributor 6 which returns to the stroke state, and the motor cycle continues.

Since the transmission chamber 32 of the motor unit 31 and the reception chamber 111 of the pump unit 11 are complementally filled by the incompressible fluid flowing in the two-way pipeline, the movements of the flexible wall 30 and of the deformable diaphragms 110 are counterparts of one another, the intake stroke of the flexible wall 30 corresponding to a delivery stroke of the diaphragm 110, reducing the volume of the pump chamber 112 and thus delivering the liquid for pumping through the valve 114 and the conduit 8 to the utilization level in the reservoir 9. When the intake stroke of the wall 30 stops, the deformable diaphragm 110 biased by the return means 117 at a greater force than that due to the hydrostatic pressure of the incompressible fluid as a result of the height of the two-way pipe 12, returns to a position corresponding to the end of the intake stroke and causes the liquid for pumping to be drawn from the underground level 10 through the valve 113 and incompressible fluid to be driven from the reception chamber 111 through the two-way pipe 12 into the transmission chamber 32 of the drive unit 3. Consequently the flexible wall 30 returns to the end of its exhaust stroke. It will be seen that the potential travel of the diaphragm 110 is greater than its actual travel, so that variations in the volume of incompressible fluid due, for example, to thermal expansion do not obstruct complete strokes of the wall 30. These volume variations therefore only have the effect of simultaneous shifting of the stroke end positions of the deformable diaphragm 110 within the potential travel limits.

For reliable operation and with a suitable output of the pumping system, it is advantageous for the return means 117 of the deformable diaphragm 110 to act on the latter with a substantially constant force slightly higher than that due to the hydrostatic pressure of the column of incompressible liquid in the two-way pipe 12, so that the pressures in the motor chamber 31 of the motor unit 3 and in the pump chamber 112 of the pump unit always correspond.

The distributor shown in FIG. 3 comprises a locking means having the general reference 200 comprising, in a sealed casing 201, a cylindrical slide 202 adapted to slide between two end positions defined by abutment of the ring 202a projecting from the periphery of the slide 202, and by abutment of the end 202b of the slide, against the bottom of the casing 201. Two resilient thrust means having the general reference 203 comprise a bush 204 terminating in a knife-edge 204a, a thrust member 205 sliding in the bush and terminating in a knife-edge 205a, and a compression spring 206 around the thrust member 205. The knife-edges 204a of the bushes are housed in grooves 201a of the locking means casing 201, while the knife-edges 205a of the thrust members 205 are housed in grooves 202c on the slide 202 midway between the ring 202a and the end 202b.

Above the locking means casing, the slide slides in a spool body 210 formed with an intake port 215 and an exhaust port 216, the two ports being spaced along the slide axis by a length equal to the travel of the slide 202 between its end positions. On the outside, a pipe 217 from the evaporator (reference 1 in FIG. 1) leads to the intake port 215 while a pipe 218 extends from the exhaust port 216 and leads to the condenser (reference 4 in FIG. 1). The slide 202 is longitudinally formed with a duct 211 and transversely with a port 213 at the position such as to register with the port 215 when the end 202b of the slide abuts the bottom of the casing 201. Level with the port 213 a circular groove 212 is formed in the slide 202 and extends longitudinally over a shorter length than the axial distance between the ports 215 and 216. Transverse grooves 211a are formed in the end face at the end 202b of the slide between the duct 211 and the periphery. The top part of the spool body 210 is fitted in sealingtight relationship to the wall 220 of a motor unit (reference 3 in FIG. 1) so that the end of the slide 202 enters the motor chamber (31 in FIG. 1). A spring 209 is crimped at one end in a groove 202d at the top of the slide 202 while its other end is crimped in a groove 207a in a circular thrust plate 207. At the center of thrust plate 207 is secured a flexible band 208, the other end of which is attached to the flexible wall (reference 30 in FIG. 1).

The distributor operation may be described as follows: the resilient thrust means 203 bias the slide 202 towards one or other of the end abutment positions on either side of a central unstable equilibrium position in which the thrust means 203 are situated opposite one another. The slide 202 will therefore be held in one of the two stable states namely: a stable intake state, with the surface 202b abutting the base of the casing 201 and the port 213 level with the intake port 215, and a stable exhaust state with the ring 202a abutting the spool body 210 and the port 213 registering with the exhaust port 216. Irrespective of the pressure in the motor chamber 31, the longitudinal thrusts on the slide due to this pressure will be balanced by the passage of vaporized fluid through the duct 211 and possibly the grooves 211a while the transverse thrusts of the resilient means 203 are balanced in any position of the slide.

With the slide 202 in the intake state, when the pressure of the vaporization fluid in the chamber 31 causes the flexible wall (reference 30 in FIG. 1) to come near the end of the intake stroke, the flexible band 8 is tensioned and applies traction to the spring 209. When the tractive tension of the spring 209 is sufficient to overcome the bias of the slide 202 towards the stable intake state through the agency of the resilient means 203, the slide 202 leaves its end position. Since the traction of the spring 209 decreases more slowly than the bias of the resilient means 203 until the central unstable equilibrium position has been passed, and cooperates with the said means beyond said central position, the change of state takes place freely without any risk of stoppage at the neutral point on the central unstable equilibrium position.

Conversely, when the flexible wall 30 returns to the position corresponding to the end of the exhaust stroke, the vaporizable fluid being expelled from the chamber 31 to the exhaust pipe 218 through the distributor in the exhaust state, with the slide 202 in the top position, the flexible wall comes into contact with the thrust plate 207 and then compresses the spring 209 until the holding force of the resilient means 203 is exceeded. Switching to the stable intake state then occurs freely as before. Since the circular groove 212 is narrower than the axial distance between the ports 215 and 216, there is at no time any direct communication between the intake pipe 217 and the exhaust pipe 218.

Figure 4:
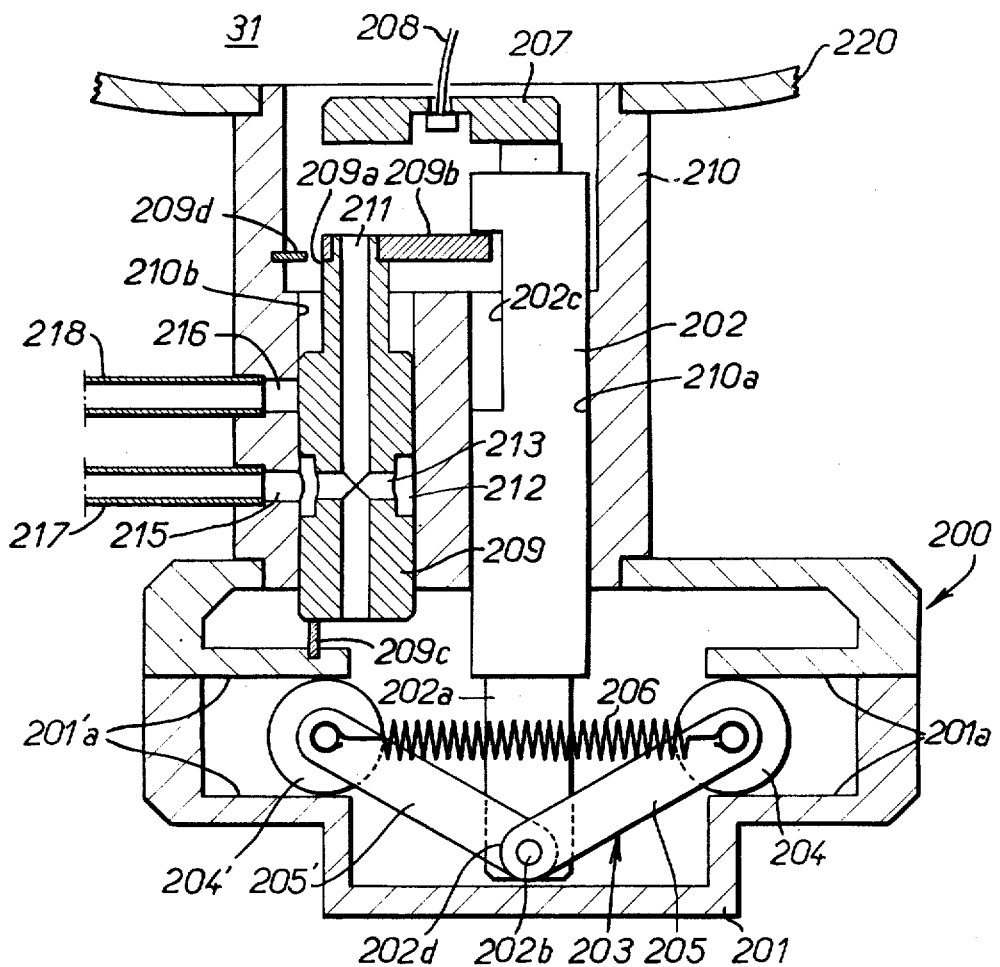
FIG. 4 illustrates a distributor with a sliding spool connected to the slide with clearance.

The distributor shown in FIG. 4 comprises a locking means having the general reference 200 and comprising a sealed casing 201, a cylindrical slide 202 adapted to slide in a recess 210a formed in a member 210. A resilient means comprising two rollers 204, 204' movable in guides 201a, 201'a formed in the locking means casing 201, links 205, 205' connecting the spindle of each roller to a common spindle 202b extending through the slide end 202a and a spring 206 biasing the spindles of the rollers 204 and 204' so as to bring them together. The guides 201a and 201'a are disposed in extension of one another and perpendicular to the axis of the slide 202. Spindle 202b is provided with a stop roller 202d which can come into contact either with the base of the casing 201 or with the bottom part of the member 210 thus defining two end positions for the slide. Traction of the spring 206 biases the slide into either of its end positions on either side of an unstable equilibrium point corresponding to alignment of the links 205 and 205'. The spool 202 is surmounted by a thrust plate 207 at the center of which is secured a flexible band 208, the other end thereof being secured, as before, to the flexible wall 30 of a motor unit 3 (FIG. 1).

A recess 210b for a sliding cylindrical spool 209 is formed in the member 210 in parallel relationship to the recess 210a of the slide 202. The spool 209 is formed with an axial duct 211, a circular groove 212 in the central part of the periphery and a transverse port 213 joining the groove 212 to the axial duct 211. Two ports, an intake port 215 and an exhaust port 217 are formed in the member 210 and lead into the spool housing 210b. The distance between the ports 215 and 216 along the spool axis is slightly greater than the width of the groove 212. The travel of the spool 209 limited by stops 209c and 209d so that the port 213 registers with the ports 215 and 216 respectively, is slightly less than half the travel of the slide 202 between its end positions. A cylindrical prolongation 209a of the spool 209 with a reduced diameter terminates in an offset finger 209b which engages in a lateral notch 202c in the slide 202. The clearance of the finger 209b in the notch 202c is equal to the difference in the travels of the slide 202 and of the spool 209 between their end positions, i.e. slightly greater than half the travel of the slide 202. Also, the axial position of the notch 202c is such that the slide 202 holds the spool 209 on the stop 209c when the distributor is in the intake state, and on the stop 209d when the distributor is in the exhaust state.

As was explained in connection with the distributor shown in FIG. 3, when the distributor is in the intake state, it allows the vaporized fluid to enter the chamber 31 and push back the flexible wall. At the end of the intake stroke the wall tensions the flexible band 208 and pulls the slide 202 by means of said band 208. Because of the clearance of the finger 209b in the notch 202c, the slide passes its unstable equilibrium point before starting to bias the spool 209 into the exhaust state by means of the finger 209b. Switching to the exhaust state is then effected by the resilient means 203 without any possible neutral point. Conversely, when the flexible wall at the end of the exhaust stroke comes into contact with the thrust plate 207, the slide 202 is pushed to beyond the unstable equilibrium positions before the spool 209 is returned to the intake state by the expansion of the spring 206 when the edge of the notch 202c comes into contact with the finger 209b, the said spring 206 acting on the slide 202 via links 205, 205'.

The movements of the spool are not counteracted by the differential pressure effects, the interior of the casing 201 being in pressure equilibrium with the motor chamber 31 via the duct 211, and the pressure forces through the ports 215 and 216 being perpendicular to the displacement of the spool 209. Thus in order to prevent the spool 209 from moving by its own weight during the travel of the slide 202, a locking means (not shown) such as a ball biased by a spring, provides a firm point for the intake and exhaust positions of the spool 209.

Figure 5:
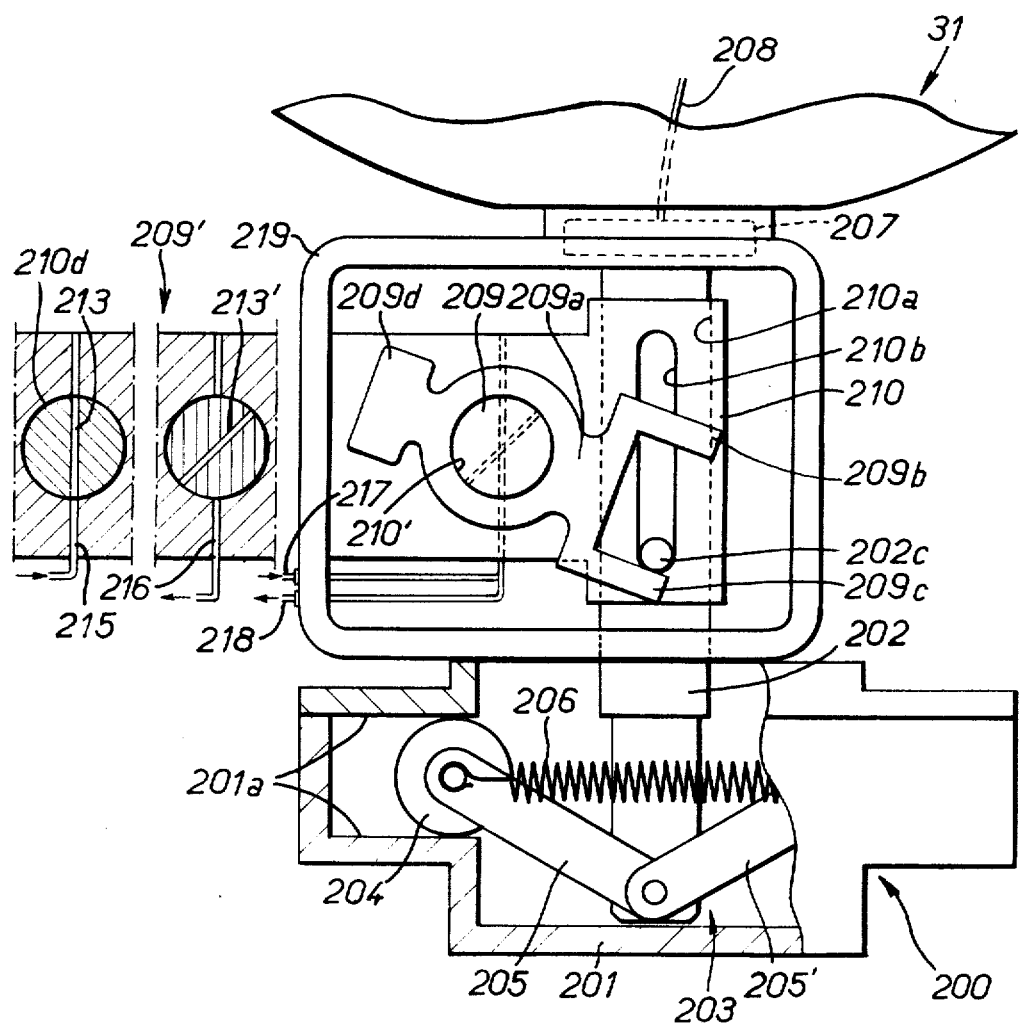
FIG. 5 shows a distributor with a pivoting spool connected to the slide with clearance.

The distributor shown in FIG. 5 comprises a locking means bearing the general reference 200 similar to that shown in FIG. 4 comprising a casing 201, guides 201a, rollers 204, links 205 and a spring 206. The slide 202 with a thrust plate 207 is also similar to that described in FIG. 4. The slide 202 is slidably guided in a recess 210a formed in a body 210 inside a sealing-tight casing 219 (shown here with a side plate removed). An oblong slot 210b is formed in the body 210 longitudinally of the recess 210a and in it moves a finger 202c connected to the slide 202 and limiting the stroke thereof. The pivoting spool 209 is a cylinder capable of turning in a recess 210d in the body 210, the axis of the spool recess 210d being horizontal and perpendicular to the axis of the recess 210a of the slide 202. A fork 209a is connected to one end of the spool 209 and has two arms 209b and 209c extending on either side of the finger 202c with a clearance slightly greater than half the travel of the finger 202c connected to the slide 202. A counterweight 209d at the opposite end to the arms 209b and 209c of the fork 209a balances the mass of said arms so that the spool 209 is in neutral equilibrium. The spool 209 is formed with two slots 213 and 213' spaced axially as will be seen from the two sections 209'. The slots 213 and 213' are angularly offset so that they come into alignment respectively with the intake and exhaust ports 215, 216 respectively formed in the body 210 in the two angular positions assumed by the spool when the finger 202c is in contact respectively with the arm 202c, with the slide in the bottom intake position, and with the arm 209b, when the slide is in the top exhaust position. The ports 215 and 216 communicate respectively with an intake pipe 217 and an exhaust pipe 218 while their extensions lead to the interior of the casing 219 in communication with the motor chamber 31 and with the locking means casing 201. Stops (not shown) limit the oscillations of the fork 209a beyond the intake and exhaust positions. The operation of the distributor shown in FIG. 5 is similar to that shown in FIG. 4, the slide 202 driving the spool 209 via the finger 202c and one of the arms 209b or 209c after passing the unstable equilibrium point during its change of state travel. Although the distributors in FIGS. 3 to 5 have distribution means in the form of spools, it is obvious that seated valves whose opening is controlled by the end positions of the slide (FIG. 3) or of the driven member (finger 209b in FIG. 4, fork 209a in FIG. 5) under the action of the driving member (notch 202c in FIG. 3, finger 202c in FIG. 5) could equally well form the distribution means.

The circulator shown in FIG. 6 is formed by the body 50 of general symmetry of revolution about an axis, in which a free piston 51 can move along said axis. Two flexible and non-extensible diaphragms 54, 55 are fixed to the body 50 at their periphery and are secured at their center to the surfaces of the free piston 51 by keys 52 and 53. The term "non-extensible flexible diaphragms" denotes diaphragms whose shape can readily change, but the surfaces of which remain substantially constant when they take pressure, so that the volumes that they define undergo practically no variation with the pressure. The body 50, the free piston 51 and the two diaphragms thus define three cavities, a first cavity 56, or motor cylinder, a second cavity 57, or intermediate cavity, and a third cavity 58, or the pump cylinder. The motor cylinder communicates via the nozzle 5a, conduit 121 (FIG. 1) and the two-way pipeline 12 (FIG. 1) with the transmission chamber 32 (FIG. 1). The system comprising the motor cylinder and the conduit 121 is filled with transmission liquid. In a variant, the nozzle 5a can communicate with the central cavity 300 in FIG. 2, the motor cylinder 56 then being fed with incompressible liquid via a two-way conduit leading from nozzle 304 (FIG. 2). The pump cylinder is in unidirectional communication with the condenser 4 via an intake valve 59, and in unidirectional communication with the conduit 6 leading to the evaporator 1 via a delivery valve 60. The area of the diaphragm 54 closing the motor cylinder 56 is larger than the area of the diaphragm 55 closing the pump cylinder 58; similarly, the surface 51a of the free piston applied against the diaphragm 54 is larger than the area 51b of this free piston 51 applied against the diaphragm 55, so that movements of the free piston 51 produce variations in the volume of the motor cylinder 56 which are greater than the corresponding variations in the volume of the pump cylinder 58. Consequently, a pressure applied to the motor cylinder 56 will be balanced by a higher pressure in the pump cylinder 58. A return means (not shown) for the free piston, which may comprise a spring or pressurization of the intermediate cavity 57, urges the free piston towards the bottom of the motor cylinder.

The incompressible liquid feeding the motor cylinder 56 and coming from either the transmission chamber 32 or the central cavity 300 (FIG. 1) as the case may be, transmits the pressures in the pumping unit, i.e. the hydrostatic pressure of immersion of the pumping unit 3 during the intake stage, and the vapor pressure of the vaporizable fluid in the motor chamber 13 of the pumping unit 3 during the delivery stage. The combined effect of the free piston return means and of the reduced pressure in the motor cylinder 56 during the intake stage results in a movement of the free piston towards the bottom of the motor cylinder and in intake of the condensed vaporizable fluid in the pump cylinder via the valve 59. During the delivery stage of the liquid for pumping, the pressure in the motor cylinder 56 ensures parallel delivery of the vaporizable fluid from the pump cylinder 58 via the valve 60 and the conduit 6 against the counteracting pressure resulting from the sum of the pressure of vaporizable fluid in the evaporator and the hydrostatic pressure of delivery of the condensed fluid from the circulator to the evaporator.

Since the delivery of the liquid for pumping and the delivery of the condensed vaporizable fluid take place in the same rhythm, the supply to the evaporator corresponds to the vapor consumption of the pumping unit.

Referring to FIG. 7, which illustrates a pump unit corresponding to a variant of the pump unit 11 in FIG. 1, a deformable diaphragm 110 comprises a rigid central disc 110a connected at its periphery by a diaphragm 110b to the body 11 of the pump unit, and thus divides said pump unit into a reception chamber 111 with an inlet nozzle 12a connecting to a two-way pipe 12, and a pump chamber 112 with an intake valve 113 and a delivery valve 114 delivering to the pipeline 8. A spacer 118 connects the rigid disc 110a to the lid 115a of a concertina diaphragm 115 which seals the pump chamber 112 while allowing a vertical relative displacement of the lid 115a, the spacer 118 and the rigid disc 110a in relation to the pump unit body 11. A counterweight 117 caps the lid 115a of the concertina diaphragm. This counterweight may be adjusted by adding or removing detachable loads, e.g. 117a of 117b, to adapt the return force on the deformable diaphragm 110 to the differences in level between the underground water and the utilization level. Guide means (not shown) provide vertical guidance of the counterweight 117. The weight of the counterweight 117 thus exerts a constant return force on the deformable diaphragm 110 irrespective of the position of the travel thereof.

Figure 8:
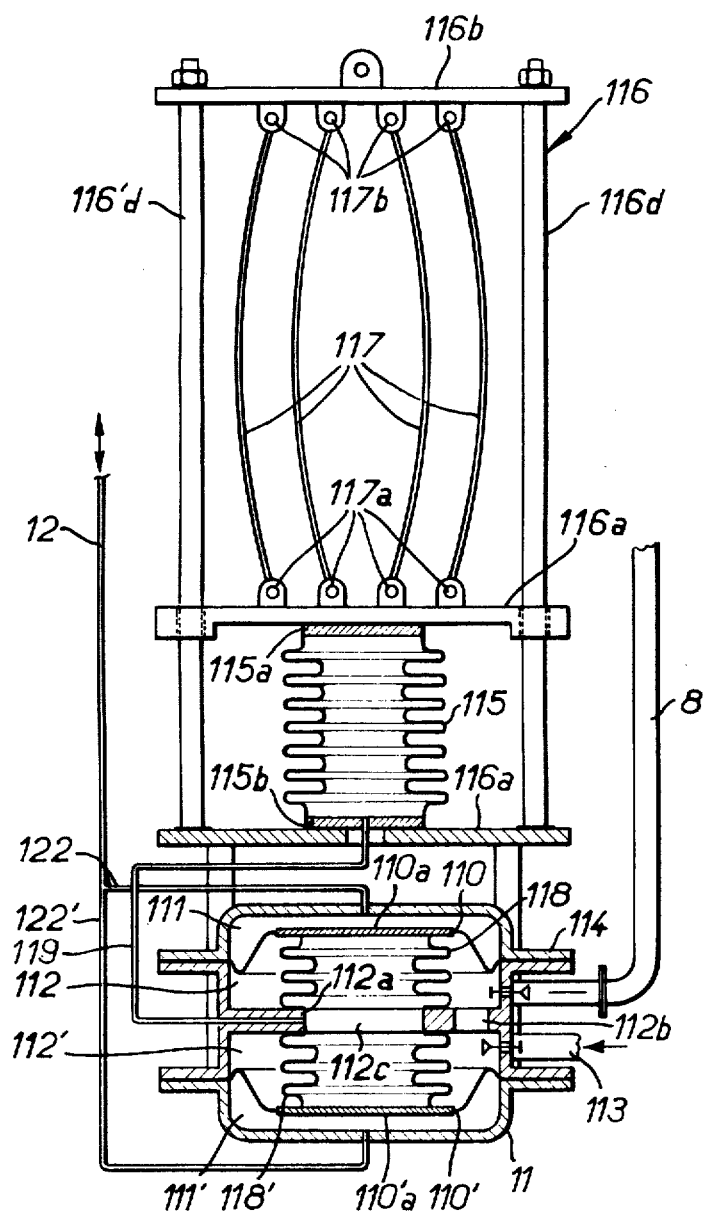
FIG. 8 shows a pump unit with a return means comprising bars or rods subjected to buckling stress.

The pump unit shown in FIG. 8 comprises a body 11 containing two deformable diaphragms 110 and 110′ each consisting of a rigid central disc 110a and 110′a, and a non-extensible diaphragm 110b, 110′b. These diaphragms 110 and 110′ respectively divide the pump unit into two reception chambers 111, 111′ respectively and two pump chambers 112, 112′ respectively. The reception chambers 111, 111′ are connected to the pipeline 12 by two pipe branches 122, 122′ respectively. The two pump chambers 112, 112′ are situated on either side of a partition 112a formed with an orifice 112b connecting them. The system comprising the chambers 112 and 112′ communicating in this way is provided with an intake valve 113 and a delivery valve 114 to the pipe 8. Two concertina diaphragms 118, 118′ jointly bearing on the partition 112a at the periphery of the cavity 112c terminate in sealing-tight relationship in the central rigid discs 110a and 110′a respectively of the deformable diaphragms 110,110′. The internal volume of the concertina diaphragms 118, 118′ communicates via the pipe 119 with the internal volume of a concertina diaphragm 115 closed by two lids, a top lid 115a and a bottom lid 115b. All the internal volumes of the diaphragms 115, 118 and 118′ are filled with a hydraulic fluid and thus form a hydraulic transmission with a transmitter cylinder 115 and a receiver cylinder formed by the system 118,118′. The concertina diaphragm 115 is engaged between a bottom cross-member 116a and a sliding cross-member 116c of a frame bearing the general reference 116 and having a top cross-member 116b and two guide uprights 116d and 116′d. Between the top cross-member 116b and the sliding cross-member 116c there are resilient bars 117 which are subjected to buckling stress and which are articulated at their bottom ends 117a on the sliding cross-member 116c and at their top ends 117b on the top cross-member 116b.

The reaction of a resilient bar subjected to buckling stress is to a large extent substantially independent of the degree to which the ends approach one another. Thus the pressure in the hydraulic transmission formed by the concertina diaphragms 115 on the one hand and 118, 118′ on the other hand will be substantially independent of the position of the sliding cross member 116c along the uprights 116d and 116′d. Consequently, the stress on the two deformable diaphragms 110 and 110′ will itself be substantially constant along the movement of said diaphragms and will thus be able to correctly compensate for the hydrostatic pressure due to the head of the pipeline 12.

Figure 9:
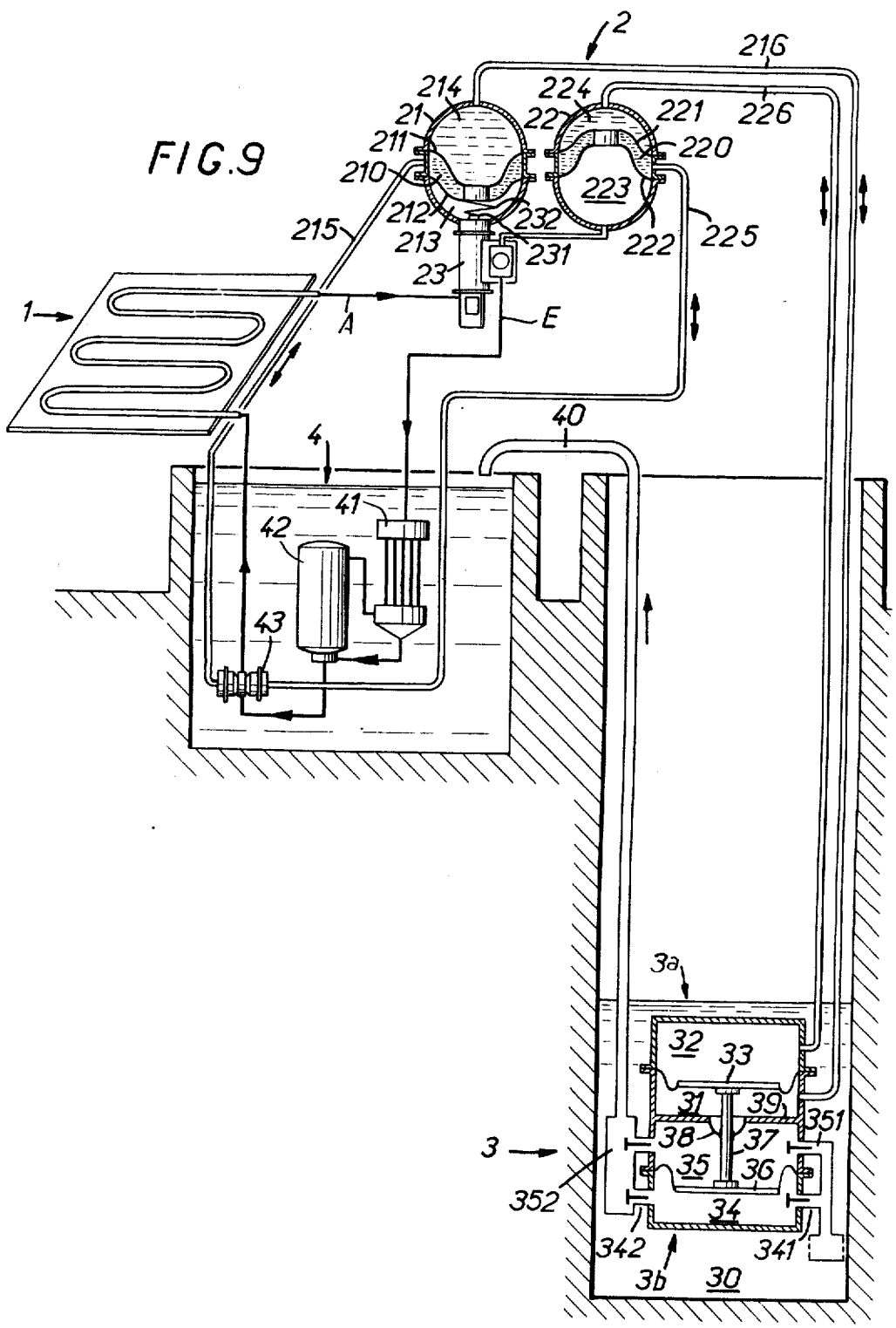
FIG. 9 is a general diagram of a double-acting pumping system.

Referring to the embodiment shown in FIG. 9, the pumping system comprises a solar panel or evaporator 1 which supplies vaporized fluid to a motor unit bearing the general reference 2 and comprising a master enclosure 21, a slave enclosure 22 and a bistable oscillating spool distributor 23 connected to the master enclosure 21. In the latter, a first flexible wall consisting of two substantially equidistant flexible diaphragms 211 and 212 divides the master enclosure 21 into a first motor chamber 213 and a first transmission chamber 214. The two flexible diaphragms 211 and 212 define between them a volume 210 filled with hydraulic liquid and communicating with one end of the circulator 43 via pipe 215. Similarly, in the slave enclosure 22, a second flexible wall formed by two flexible diaphragms 221 and 222 divides said enclosure into a second motor chamber 223 and a second transmission chamber 224. A volume 220 defined by the two flexible diaphragms 221 and 222 is filled with hydraulic liquid and communicates via the pipe 225 with a second end of the circulator 43. In the enclosure 21, the diaphragm 212 is connected to the slide 231 of the distributor 23 via a flexible band 232, slide 231 projecting inside the first motor chamber 213.

In the sheet 30 of liquid for pumping, a pump unit bearing the general reference 3 comprises a receiver body 3a and a pump body 3b. In the receiver body 3a, a deformable diaphragm 33 divides the body into a first reception chamber 31 connected to the first transmission chamber 214 via the two-way pipe 216, and a second reception chamber 32 connected to the second transmission chamber 224. An incompressible fluid complementally fills the volumes formed by the first transmission chamber 214, the two-way pipe 116 and the first reception chamber 31 on the one hand, and the second transmission chamber 224, the two-way pipe 226, and the second reception chamber 32. Divided from the receiver body 3a by the partition 39, the pump body 3b is divided into two pump chambers 34 and 35 by a deformable diaphragm 36. Pump chambers 34 and 35 are provided with intake valves 341 351 respectively, leading to the liquid 30 for pumping, and delivery valves 342 and 352 respectively leading to the pumped liquid reservoir 4 via the delivery pipe 40. The deformable diaphragms 33 of the receiver body 3a and 36 of the pump body 3b are connected for movement by a spacer 37 which extends through partition 39, a bellows 38 providing sealing-tightness between the partition 39 and the spacer 37 while allowing longitudinal reciprocation of the spacer 37.

Immersed in the pumped liquid reservoir 4 are: a condenser 41 connected to the exhaust outlet of the distributor 23, and a condensed vaporizable fluid reservoir 42. Circulator 43, which will be described in greater detail hereinafter, draws the condensed vaporizable fluid from the reservoir 42 and feeds it to the evaporator 1.

Figure 10:
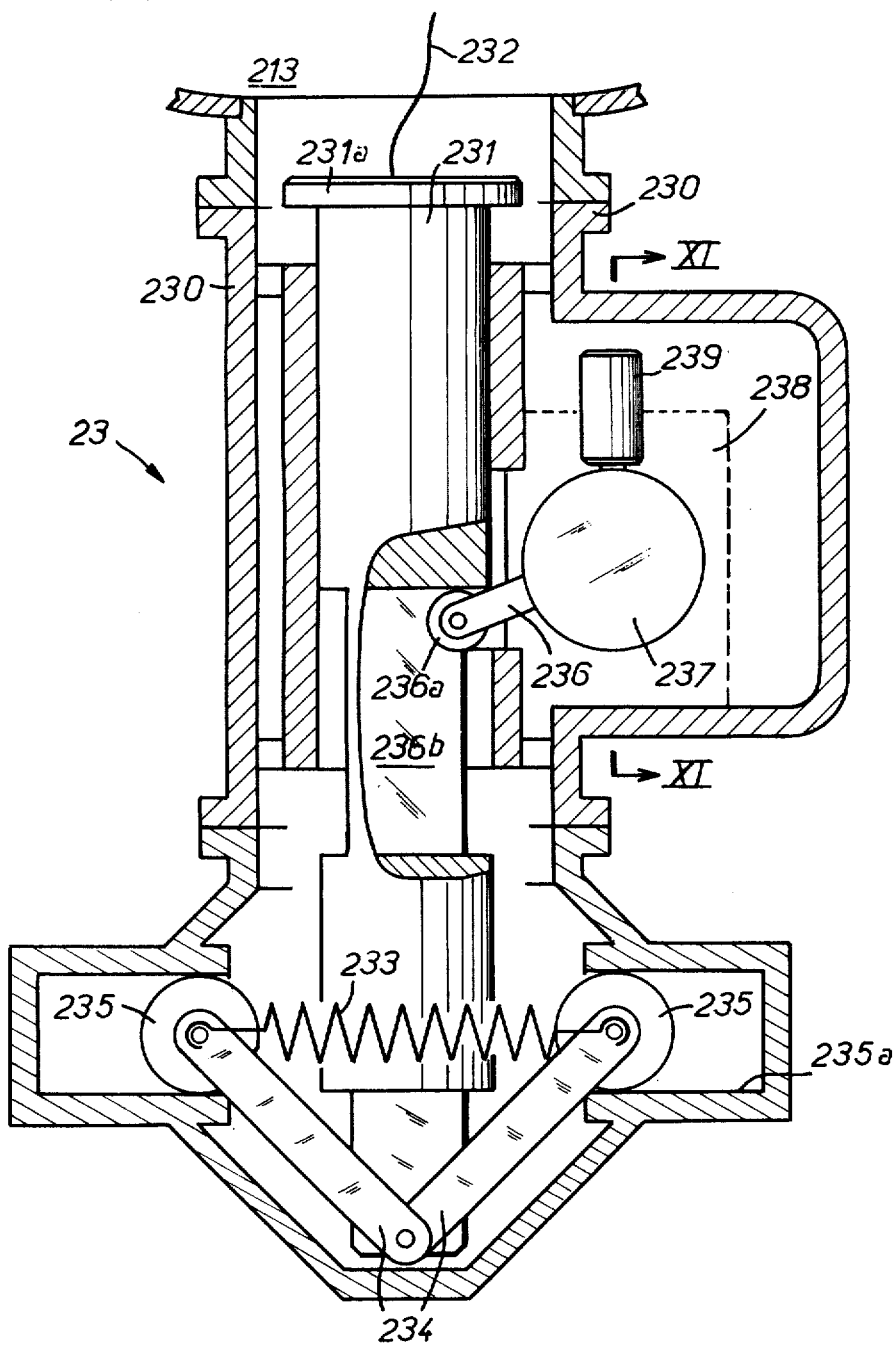
FIG. 10 is a section of a bistable distributor for a double-acting pumping system.

The bistable distributor 23 shown in FIG. 10 comprises a general casing 230 containing a vertical slide 231, the top of which is provided with a thrust plate 231a, to the center of which is attached a flexible band 232 connected at its other end to the center of the flexible wall of the master enclosure 21. A bistable locking means is secured to the bottom part of the slide 231 and comprises a calliper-type link assembly 234 with rollers 235 held in guides 235a and urged towards one another by a spring 233.

An oblong slot 231b in the central part of the slide 231 holds a roller 236a captive with a longitudinal clearance slightly greater than half the travel of the slide 231, roller 236a being disposed at the end of an arm 236 connected to the oscillating spool 237. This spool is housed in a body 238 and is provided with a top counterweight 239.

Figure 11:
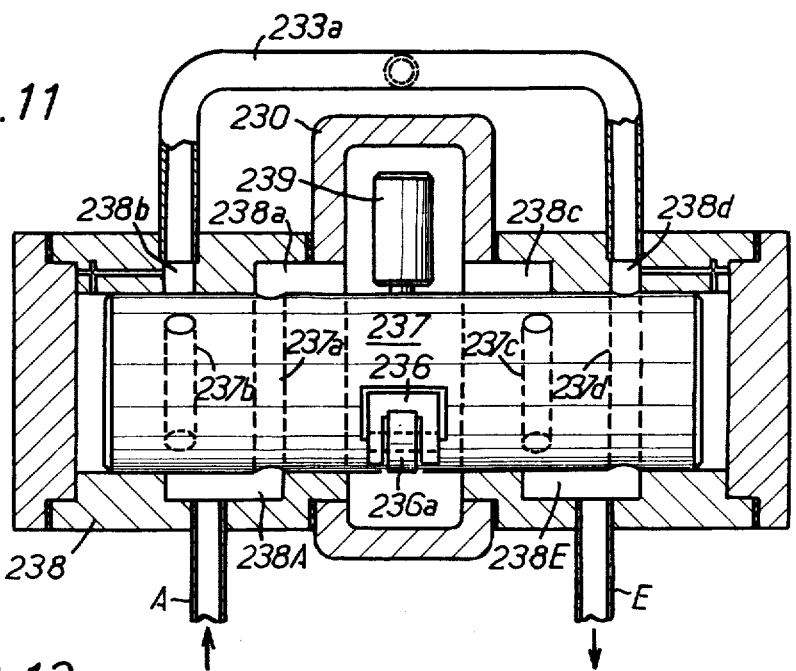
FIG. 11 is a section on the line XI—XI in FIG. 10.

As will be clearer from FIG. 11, the oscillating spool 237 is a cylinder turning in the body 238. Transverse intake ports 237a and 237b, and transverse exhaust ports 237c and 237d are formed on either side of the central part of the spool 237 where the arm 236 and the counterweight 239 are fixed. The ports 237a and 237d are parallel to one another and the same applies to the ports 237b and 237c, the group 237a, 237d being offset angularly with respect to the group 237b, 237c so that in a first end position of the oscillation of the spool 237 the group of ports 237a, 237b is vertical, while in the second end position the group 237b, 237c is vertical. The bottom generatrix of the body 238 is formed with longitudinal intake and exhaust grooves 238A, 238E respectively communicating with the intake and exhaust pipes A, E respectively, while the top generatrix is formed with longitudinal grooves 238a, 238c communicating with the first motor chamber 213 via the interior of the casing 230, and transverse ports 238b and 238d communicating with the second motor chamber 233 via the pipe 223a.

Figure 12:
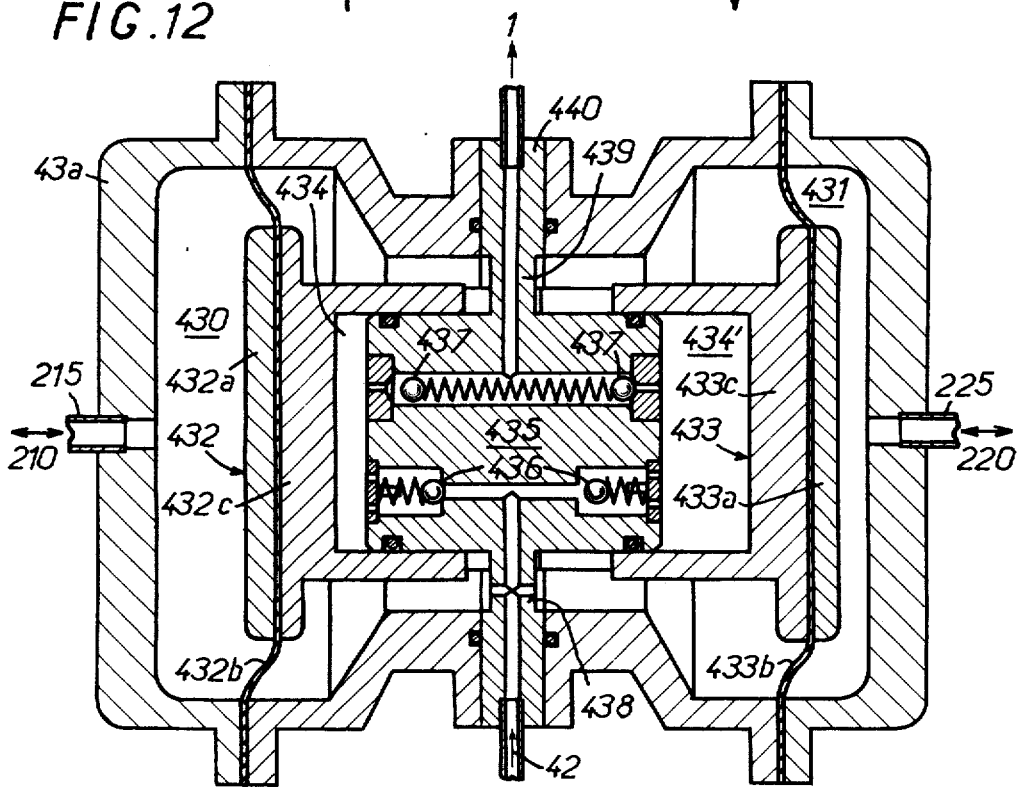
FIG. 12 is a section of a double-acting circulator.

The circulator 43 shown in FIG. 12 comprises a body 43a which is generally cylindrical and symmetrical with respect to a central plane, said body containing two motor cylinders 430 and 431 respectively communicating via pipes 215, 225 with the volumes 210 and 220 between the flexible diaphragms of the enclosures 21 and 22. These motor cylinders 430 and 431 respectively terminate in deformable diaphragms 432 and 433 comprising a central rigid disc 432a, 433a and a nonextensible deformable peripheral diaphragm 432b, 433b. These deformable diaphragms 432, 433 bear on either side of a double-acting inline pump comprising a fixed piston 435 connected by spokes 438, 439 to a rim 440 forming part of the circulator body 43a, and two spacer cylinders 432c, 433c, secured to one another and respectively connected to the deformable diaphragms 432, 433. Spoke 438 is formed with a duct communicating with the reservoir 43 and terminates in two intake valves 436 in piston 435. Spoke 439 is formed with a duct communicating with evaporator 1 and terminating in two delivery valves 437 in the piston 435. A pump volume 434 is provided between the spacer cylinder 432c and piston 435, and a complementary pumped volume 434' between the cylinder 433c and piston 435.

The pumping system operation may be described as follows:

In the states shown in FIGS. 9, 10 and 11, the flexible wall of the master enclosure 21 leaves its exhaust stroke end position while the flexible wall of the slave enclosure 22 is near the end of its intake stroke. Slide 231 of distributor 23 is held by the bistable locking means 233, 234 in its end pushed position so that the slot 231b holds the oscillating spool, by means of arm 236 and roller 236a, in a position such that the port 237a brings the intake groove 238A into communication with the first motor chamber 213 via the groove 238a and the interior of the casing 23a, while the port 237d connects the second motor chamber 233 to the exhaust groove 238E via port 238d and pipe 233a. Under these conditions, the fluid vaporized by the evaporator 1 is admitted into the first motor chamber 213, applies pressure to the flexible diaphragm assembly 211, 212 in accordance with the intake stroke and pressurizes the hydraulic liquid in the volume 210 and expels incompressible fluid from the first transmission chamber 214 via the two-way pipe 236 to the first reception chamber 31. The first deformable diaphragm 33 in the receiver body 3a moves and expels incompressible fluid from the second reception chamber 32 via the two-way pipe 226 to the second transmission chamber 224 in the slave enclosure 22. In this enclosure, the second flexible wall 221, 222 moves complementally to the first flexible wall 211, 212 in the master enclosure and the vaporized fluid present in the second motor chamber 223 escapes via pipe 233a, port 238d, port 237d, exhaust groove 238E and pipe E to condenser 41.

When the first flexible wall 211, 212 nears the end of its intake stroke, the flexible band 232 tensions and subjects the slide 231 to traction against the action of the bistable locking means 233, 234, 235. When the latter has passed its unstable equilibrium position corresponding to alignment of the calliper legs 234, the bottom surface of the longitudinal slot 231b comes into contact with the roller 236a of the arm 236. Expansion of spring 233 urges slide 231 into its end traction position and the resulting movement of the slide causes the spool 237 to pivot about its pivot axis. The first motor chamber 213 then communicates with condenser 41 via the interior of casing 230, groove 238c, port 237c, exhaust groove 238E and exhaust pipe E, while the second motor chamber 233 communicates with the evaporator via the pipe 223a, port 238b, port 237b, intake groove 238A and intake pipe A. Under these conditions, the flexible walls 211, 212 and 221, 222 perform a movement which is the reverse of the first movement, and the same applies to the first deformable diaphragm 33 which is connected for movement by the complemtary displacement of the incompressible fluid in the two-way pipes 216 and 226.

During this return movement, when the flexible wall 211, 212 in the master enclosure 21 thrusts against the thrust plate 231a of the slide 231 which is held in the top end position by the bistable locking means 233, 234, 235, it pushes the slide 231 against the action of the spring 233. When the slide 231 has passed the unstable equilibrium position of the bistable locking means 233, 234, 235, the top surface of the longitudinal slot 231b makes contact with the roller 236a and, under the expansion of the spring 233, pivots the spool 237 about its pivot axis so that it resumes the first position with the first motor chamber 213 operating under intake conditions and the second motor chamber under exhaust conditions.

It will be seen that the unbalance transmitted to the oscillating spool by the combination of the weights of the arm 236 and of the counterweight 239 is situated about the pivot axis of the spool 237 and substantially symmetrical with respect to the vertical of said axis in the two end positions of the oscillating spool 237, so that these end positions are thus made stable when the slot 231b releases the roller 236a. It will also be seen that the ducts in the body 238 connect the ports 238b and 238d to the volumes situated on either side of the end edges of the spool 237 so that these volumes are subjected to the same pressure as in the pipe 233a to cancel out the axial thrusts on the spool 237.

The alternate movements of the first deformable diaphragm 33 in the receiver body 3a as a result of the complementary alternate movements of the incompressible fluid in the two-way pipes, are transmitted via the spacer 37 to the second deformable diaphragm 36 in the pump body 3b. This alternate movement of the diaphragm 36 combined with the action of the intake valves 341 and 351 and of the delivery valves 342 and 352 results in regular pumping of the liquid from the underground level 30 to the reservoir 4 via the pipe 40 both during the outgoing and the return strokes. The vertical head is equal for the two-way pipes 216 and 226 so that the resultant hydrostatic pressures of the incompressible fluid are substantially balanced on either side of the deformable diaphragm 33.

Since in the master and slave enclosures 21, 22, the pressures in the motor chambers 213, 223 are transmitted by the flexible walls 211 and 222 to the incompressible liquid contained in the volumes 210 and 220 respectively between the flexible walls 211 and 212, and 221 and 222, the pipes 215 and 225 in turn transmit these pressures respectively to the motor cylinder 430 and 431 of the circulator shown in FIG. 12. Thus the connected assembly formed by the deformable diaphragms 432 and 433 and the spacer cylinders 432c and 433c will be subjected to alternate axial displacement. Consequently, the pump volumes 434 and 434' will alternately vary complementally, one drawing condensed vaporized fluid from the reservoir 42 via the corresponding valve 436 while the other will deliver this condensed fluid to the evaporator via the corresponding valve 437, this double-action pumping being in the rhythm of operation of the master and slave enclosures, so that the rate of flow of incoming condensed vaporizable fluid to the evaporator is proportional to the outgoing vaporized flow to actuate the motor unit.

The system according to the invention is particularly advantageous because it enables the motor unit, evaporator, condenser and circulator to be combined at the utilization level to form a system operating with two motor strokes per cycle, and it also enables a pumping unit to be disposed in the underground liquid for pumping without any need to compensate for the hydrostatic pressure of the head of incompressible fluid, said head being balanced in the two two-way pipes and acting on either side of the deformable diaphragm of the receiver body. Moreover, the difference in level between the underground liquid for pumping and the utilization level is limited neither by the barometric head of liquid for pumping nor by the pressure of vaporizable fluid admitted to the motor chambers, because the ratio of the areas of the deformable diaphragms in the receiver body and the pump body can be adjusted to the ratio of the hydrostatic pressure due to the difference in levels to the vaporized fluid pressure available in the evaporator.

The vaporizable fluid will be selected according to local conditions, i.e. more particularly the temperatures available at the evaporator and condenser, which may if required be immersed in the underground liquid for pumping or, usually, in the pumped liquid reservoir at the utilization level. As a general rule, the vapor pressure of the vaporizable fluid at the evaporator temperature must be higher than the hydrostatic pumping head pressure, while the vaporizable fluid vapor pressure at the condenser temperature must be less than the delivery pressure of transmission liquid in the transmission chamber. As an example without any limiting force, the vaporizable fluid may be selected from the group comprising trichloromonofluoromethane, trichlorotrifluoroethane and the aliphatic pentanes.

It will be appreciated that the variants described for the pumping system according to the invention are fully independent. The circuit in which the vaporizable fluid flows is perfectly sealing-tight, there being no sliding or rotary gasket between this circuit and the exterior. The transmission liquid circuits are also sealing-tight. The action of the internal distributor ensures operation without any neutral positions irrespective of the speed of operation of the pumping system. Finally, in the event of the evaporator pressure dropping, for example due to reduced sunshine at the end of the day, pumping stops; the system is, however, capable of resuming operation as soon as the pressure is restored at the evaporator. In fact, in the double-acting operation arrangement shown in FIG. 9, there is always one motor chamber operating under intake conditions and in the arrangement shown in FIG. 1 the return means returns the flexible wall at the end of the exhaust stroke via the transmission liquid so that the distributor is re-set to the intake state if it were not already there.

Of course the invention is not limited to the systems described and numerous variants are possible without departing from the scope of the invention. For example, the return means for the non-extensible deformable diaphragm of the pump unit could be formed by a column of liquid in a vertical tube, this head compensating for the hydrostatic head of the transmission liquid.

It is also obvious that the addition of accessory systems, e.g. systems for obtaining a regular flow of vaporizable fluid, of the type comprising a constant-level tank for feeding the evaporator, and nonreturn valves, pressure transformer systems or expansions tanks in the transmission liquid pipes, would not depart from the scope of the invention.

Similarly, the application of the pumping system according to the invention to the pressurization of any fluid even if it does not entail raising the height of the fluid, would not depart from the scope of the invention. A system of this kind could be used, more particularly, as a compressor or a circulator in a refrigerating unit for a refrigerator or an air-conditioning installation.

The use of a heat source other than solar radiation for the evaporator would also come within the scope of the invention.

What is claimed is:

1. A pumping system comprising a pumping unit formed by a motor and a pump and adapted to raise a liquid from an underground level to a utilization level, a vaporizable fluid flowing in a closed circuit between a solar evaporator and a condenser, the said motor being disposed in the outgoing branch between the evaporator and the condenser and a circulator being disposed in the return branch to the said evaporator, and in which system the motor comprises a motor chamber which is connected by a bistable distributor either to the evaporator when said distributor is in an intake state, or to the condenser when said distributor is in an exhaust state, said motor chamber being partly defined by a flexible wall free to move between an intake stroke end position and an exhaust stroke end position, the flexible wall triggering the changes of state of the distributor by reaching its two end positions, the said pumping system being characterized in that the distributor is biased by a resilient means into one of its two stable states on either side of an unstable equilibrium state, and is urged into its stable exhaust state by a flexible band tensioned by said flexible wall in the intake stroke end position, and is pushed into its stable intake state by said flexible wall in its exhaust stroke end position, a transmission chamber separated from said motor chamber by the said flexible wall, and a pump unit having, on either side of a deformable diaphragm, a pump chamber provided with an intake valve drawing from the said underground water level, and a delivery valve for delivery to the said utilization level and a reception chamber communicating with the said transmission chamber via a two-way pipeline, an incompressible transmission liquid complementally filling the said transmission and reception chambers as it flows in the said two-way position.

2. A pumping system according to claim 1, characterized in that the said distributor comprises a locking means with a slide adapted to move between two end positions in response to the action of said flexible wall and urged into one of said two end positions by the said resilient means on either side of an unstable equilibrium position, an intake closure means, an exhaust closure means, and a transmission member between the said locking means and the said closure means adapted to close a first closure means and then open the second closure means after the said slide has passed the said unstable equilibrium position.

3. A pumping system according to claim 2, characterized in that the said closure means are formed by a spool having an intake port and an exhaust port, one port being closed when the other is open.

4. A pumping system according to claim 3, characterized in that the said spool operates by sliding.

5. A pumping system according to claim 3, characterized in that the said spool operates by pivoting.

6. A pumping system according to claim 2, characterized in that the said transmission member being constantly in engagement with said slide, the latter is actuated by the flexible wall through the agency of a resilient connecting means adapted to act on said slide beyond the said unstable equilibrium position when the said flexible wall reaches the said stroke end positions.

7. A pumping system according to claim 2, characterized in that the said transmission member comprising a driving member connected to the said slide and a driven member in constant engagement with the said closure means, a clearance is provided between the driving and driven members so that the driving member drives the driven member only after the said slide has passed the said unstable equilibrium position.

8. A pumping system according to claim 1, characterized in that the said condenser is immersed in the said underground liquid.

9. A pumping system according to claim 1, characterized in that the said condensor is immersed in a reservoir fed with liquid pumped to the said utilization level.

10. A pumping system according to claim 1, characterized in that the said flexible wall is made up of two substantially equidistant flexible diaphragms fixed at their periphery to a body forming an outer wall of said motor and connected at their center by a spacer and defining between them a central cavity filled with an incompressible liquid.

11. A pumping system according to claim 1, characterized in that the said circulator comprises on either side of a free piston: a pump cylinder provided with valves adapted to pass the said vaporizable fluid unidirectionally from the condenser to the evaporator, and a motor cylinder communicating with the transmission chamber via a two-way conduit so that the said transmission liquid actuates the said free piston.

12. A pumping system according to claim 10, characterized in that the said circulator comprises on either side of a free piston: a pump cylinder provided with valves adapted to pass the said vaporizable fluid unidirectionally from the condenser to the evaporator and a motor cylinder communicating with the said central cavity via a two-way conduit, so that the said incompressible liquid actuates the said free piston.

13. A pumping system according to claim 11, characterized in that the said pump cylinder has a smaller section than the said motor cylinder, the said free piston being adapted to slide in sealing-tight relationship also in the said motor cylinder and in the said pump cylinder.

14. A pumping system according to claim 13, characterized in that sealing-tightness between the said free piston and the said motor and pump cylinders is provided by substantially non-extensible deformable diaphragms.

15. A pumping system according to claim 1, characterized in that a return means in the said pump unit urges the said deformable diaphragm in the direction which delivers the said transmission liquid to the said transmission chamber.

16. A pumping system according to claim 15, characterized in that the said deformable diaphragm being substantially non-extensible, the said return means acts on said diaphragm with a constant adjusted force.

17. A pumping system according to claim 16, characterized in that the said return means is a counterweight.

18. A pumping system according to claim 16, characterized in that the said return means comprises resilient bars or rods subjected to buckling stress.

19. A pumping system according to claim 16, characterized in that the said return means biases the said non-extensible deformable diaphragm by means of a hydraulic transmission comprising transmitter and receiver cylinders having longitudinally deformable non-extensible side walls.

20. A pumping system according to claim 15, characterized in that the said pump unit comprises a plurality of deformable diaphragms, each diaphragm being disposed between reception and pump chambers, each of the said deformable diaphragms being biased by the said return means in the direction which delivers the said transmission liquid to the said transmission chamber.

21. A pumping system according to claim 1, characterized in that it comprises on the one hand a motor unit consisting of a master enclosure divided by a first flexible wall into a first motor chamber and a first transmission chamber, a slave enclosure divided by a second flexible wall into a second motor chamber and a second transmission chamber, and a bistable distributor switched at the ends of the strokes of the first flexible wall and adapted to bring the said first and second motor chambers into alternate symmetrical communication with the said evaporator and the said condenser and, on the other hand, a pump unit divided into two bodies by a non-deformable partition, a reception body divided by a first deformable diaphragm into two complementary reception chambers respectively communicating with the said first and second transmission chambers via two two-way pipelines, an incompressible transmission liquid complementally filling the two reception chambers and the first and second transmission chambers, and a pump body divided by a second deformable diaphragm into two pump chambers each provided with intake valves for drawing from the underground liquid and delivery valves for delivering to the utilization level, the first and second diaphragms being connected by a central spacer extending through said partition via an orifice closed by a bellows.

22. A pumping system according to claim 21, characterized in that the said first and second deformable diaphragms have unequal areas.

23. A pumping system according to claim 21, characterized in that the said circulator comprises two motor cylinders, terminating in deformable diaphragms bearing on either side of a double-acting in-line pump, the said motor cylinders being complementally fed with incompressible liquid by two two-way conduits respectively leading from the master and slave enclosures, while the said double-acting pump communicates with the condenser via intake valves and with the evaporator via delivery valves.

24. A pumping system according to claim 21, characterized in that the said bistable distributor comprises a slide springbiased into one of two end positions on either side of a central unstable equilibrium position and subjected to traction by means of a flexible band by the said flexible wall reaching the end of the intake stroke and pushed by said flexible wall when it reaches the end of its exhaust stroke, and an oscillating spool adapted to symmetrically and alternately change-over the intake and exhaust on the two motor chambers in response to the said slide passing the said unstable equilibrium position.

25. A pumping system according to claim 1, characterized in that the said vaporizable fluid is selected from the group comprising trichloromonofluoromethane, trichlorotrifluoroethane and the aliphatic pentanes.

* * * * *